(12) United States Patent
Bamberger et al.

(10) Patent No.: US 8,302,199 B2
(45) Date of Patent: Oct. 30, 2012

(54) ANTI-CHEAT FACILITY FOR USE IN A NETWORKED GAME ENVIRONMENT

(75) Inventors: Matthew Bamberger, Seattle, WA (US); Nicholas Shaffner, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 1025 days.

(21) Appl. No.: 11/101,031

(22) Filed: Apr. 6, 2005

(65) Prior Publication Data

US 2006/0247038 A1 Nov. 2, 2006

(51) Int. Cl.
*H04L 29/06* (2006.01)
(52) U.S. Cl. .................... 726/26; 713/151; 713/182
(58) Field of Classification Search ............... 463/29
See application file for complete search history.

(56) References Cited

U.S. PATENT DOCUMENTS

| | | | |
|---|---|---|---|
| 7,051,200 B1 * | 5/2006 | Manferdelli et al. | 713/153 |
| 7,218,739 B2 * | 5/2007 | Multerer et al. | 380/251 |
| 7,287,052 B2 * | 10/2007 | Chen et al. | 709/203 |
| 2001/0034712 A1 * | 10/2001 | Colvin | 705/52 |
| 2002/0026321 A1 * | 2/2002 | Faris et al. | 705/1 |
| 2003/0177347 A1 * | 9/2003 | Schneier et al. | 713/151 |
| 2004/0078572 A1 * | 4/2004 | Pearson et al. | 713/170 |
| 2005/0044359 A1 * | 2/2005 | Eriksson et al. | 713/165 |
| 2007/0225057 A1 * | 9/2007 | Moshal | 463/16 |

\* cited by examiner

*Primary Examiner* — Eleni Shiferaw
*Assistant Examiner* — Jeffery Williams
(74) *Attorney, Agent, or Firm* — Frommer Lawrence & Haug LLP; Matthew M. Gaffney (57) ABSTRACT

The invention is directed to detecting and taking action against unauthorized behavior, such as cheating, committed by a participant in a networked game. A game client receives from an anti-cheat server one or more encrypted blocks containing executable code and computer-readable data. The anti-cheat server transmits a series of challenges, at periodic or randomly-determined intervals, to the game client. A challenge includes instructions regarding the decryption and manipulation of a black box. The anti-cheat server monitors responses, if any, by the game client to the challenges, and determines whether the game client is engaged in unauthorized behavior. The nature of a challenge is such that the player is not easily able to determine or predict whether the challenge actually performs a meaningful cheat-detection procedure, whether the challenge is identical to a challenge received by another player, and whether the challenge is substantially the same as a previously-received challenge.

33 Claims, 4 Drawing Sheets

ANTI-CHEAT FACILITY FOR USE IN A NETWORKED GAME ENVIRONMENT

FIELD OF THE INVENTION

The present invention relates to networked multiplayer games, and, in particular, but not exclusively, to a system and method for detection and prevention of cheating and other unauthorized behavior in such games.

BACKGROUND OF THE INVENTION

The growth in popularity and complexity of multiplayer online games has been accompanied by an increase in the problem of cheating. Many kinds of cheats are currently in use by players of such games. Typically, a cheat is designed to give a player an unfair advantage over other players. Cheats commonly expose game states or other information that otherwise would be hidden from the player (for example, the ability to see through walls or to see into the future). A cheat may also involve the manipulation of the game client program to enhance the player's abilities. A cheating player might use the application programming interface provided with a game program to manipulate the workings of the program and extract information about the game, or the player might intercept graphics commands issued by the program to the operating system. Cheating and other unauthorized behavior may also be perpetrated to harm other players and to cause general disruption in the operation of the game.

The detection and prevention of cheating and other unauthorized behavior is important in ensuring the quality of service of multiplayer online games, because if such behavior is uncurbed, non-cheating players tend to abandon the game. Some game providers have developed techniques for detecting cheats of various kinds. However, the nature of cheat detection in a networked game setting has limited the effectiveness of anti-cheat systems. To detect a cheat or other unauthorized activity, an anti-cheat facility typically executes code on a game client machine. The code examines the machine and reports results. It is important that the anti-cheat facility be able to trust the results. Because the cheating player is, presumably, in control of the machine, he typically can examine the executing anti-cheat code and figure out what the code is doing, regardless of its complexity or obscurity. A sophisticated cheater can thus find ways of avoiding detection and of subverting the anti-cheat system.

Two problems in particular have arisen in previous anti-cheat systems. In one case, the client is actually cheating but deceptively leads the system to conclude that it is not cheating. In another case, a cheating player attacks the integrity of the anti-cheat system by causing the system to believe that he is a different, non-cheating player. The system then bans the innocent player from participating in the game. In both cases, the cheating player uses his control of the client machine to diminish the ability of the system to trust the results of anti-cheat detection code. It is with respect to these considerations and others that the present invention has been made.

BRIEF DESCRIPTION OF THE DRAWINGS

For a better understanding of the present invention, reference will be made to the following detailed description, which is to be read in association with the accompanying drawings, wherein.

DETAILED DESCRIPTION OF THE INVENTION

In the following detailed description, reference is made to the accompanying drawings, in which are shown exemplary but non-limiting and non-exhaustive embodiments of the invention. These embodiments are described in sufficient detail to enable those having skill in the art to practice the invention, and it is understood that other embodiments may be used, and other changes may be made, without departing from the spirit or scope of the invention. The following detailed description is, therefore, not to be taken in a limiting sense, and the scope of the invention is defined only by the appended claims. In the accompanying drawings, like reference numerals refer to like parts throughout the various figures unless otherwise specified.

Throughout this specification and in the accompanying claims, the term "cheating" is employed to refer not only to actual violations of rules of play with respect to particular online games but also more broadly to disruptive or unauthorized behavior by a player that has the effect of undermining the integrity of and players' trust in the game system, including an anti-cheat system deployed by the game system to detect and combat cheating. The term "unauthorized behavior" includes, but is not limited to, cheating by a game participant. "Detecting" is employed herein to refer both to identifying cheating players and to taking action against such players and behavior.

Briefly stated, the present invention is directed to a system, apparatus, method, and computer program product for detecting and responding to unauthorized behavior committed by a player in a networked game. The invention may employ a networked anti-cheat server, game server, and one or more game clients. The invention may also operate in a peer-to-peer environment with multiple participants, and the invention may operate within other kinds of environments or architectures for computer games. In one embodiment, a game client receives from the anti-cheat server an anti-cheat module and one or more "black boxes." A black box is encrypted instructions or data containing, in its unencrypted form, executable code and computer-readable data. The black box is preferably customized for the game client to which it is provided. The encrypted instructions may be communicated over a network or by way of other computer-readable media.

In accordance with the invention, the anti-cheat server transmits a series of challenges to the game client (or the anti-cheat module). Challenges may be sent at regular or irregular periodic or randomly-determined intervals. A challenge may include a decryption key and one or more parameters, and includes instructions regarding the decryption and manipulation of a black box. A challenge may also include or be accompanied by a new black box. Typically, the game client is instructed to decrypt a section of the black box, execute it with any supplied parameters, perform any other provided instructions, and return a result to the anti-cheat server within a certain period of time. A challenge might also or in the alternative include or be accompanied by unencrypted code to be executed by the game client. The executed routine may include a cheat detection routine, a no-op routine, or another kind of routine. The anti-cheat server monitors responses, if any, by the game client to the challenges, and may determine, based on this monitoring, that the game client is likely engaged in unauthorized behavior, such as cheating. The nature and complexity of the challenge are such that the player typically is not easily able to determine or predict whether the challenge will actually perform a meaningful cheat-detection procedure, whether the challenge is identical to a challenge received by another player, and whether the challenge is substantially the same as a previously-received challenge.

Illustrative Operating Environment

Figure 1:
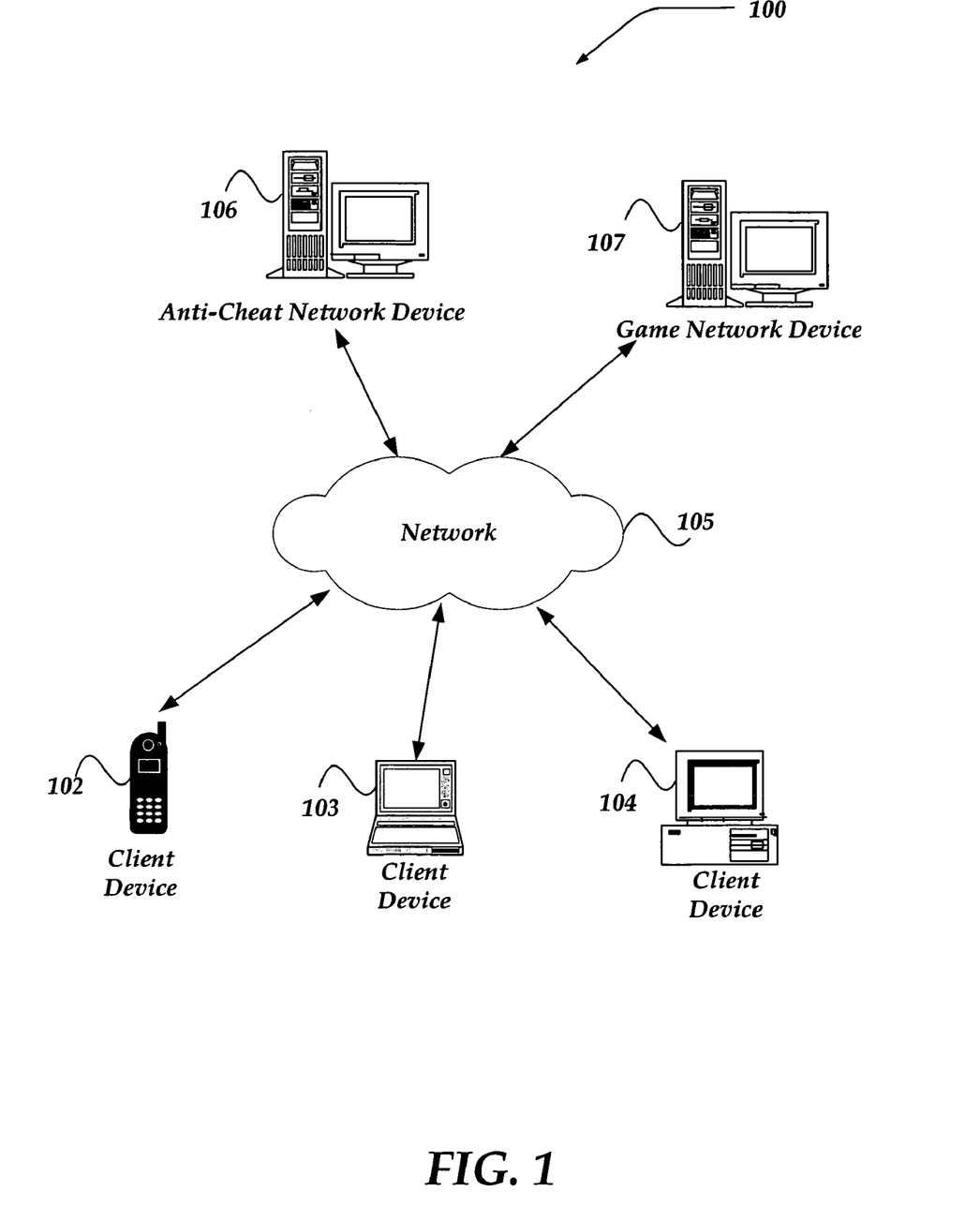
FIG. 1 illustrates one embodiment of an environment in which the invention may operate.

FIG. 1 illustrates one embodiment of an environment in which the invention may operate. However, not all of these components may be required to practice the invention, and variations in the arrangement and type of the components may be made without departing from the spirit and scope of the invention.

As shown in the figure, system 100 includes client devices 102-104, network 105, anti-cheat network device 106, and game network device 107. Network 105 enables communication among client devices 102-104, anti-cheat network device 106, and game network device 106.

Generally, client devices 102-104 may in principle include any computing device capable of connecting to another computing device to send and receive information, including game information and anti-cheat detection information. The set of such devices may include devices that typically connect by way of a wired communication medium, such as personal computers, microprocessor-based or programmable consumer electronics, network PCs, and the like. The set of such devices may also include devices that typically connect by way of a wireless communication medium, such as cell phones, smart phones, radio frequency (RF) devices, infrared (IR) devices, integrated devices combining one or more of the preceding devices, mobile devices, and the like. Similarly, client devices 102-104 may include any device that is capable of connecting by way of a wired or wireless communication medium, such as PDA, wearable computer, and any other device that is equipped to communicate over a wired and/or wireless communication medium. Client devices 102-104 may further include a client application or the like that is configured to manage the actions described above. It will be appreciated by those having skill in the art that the invention may be practiced in a peer-to-peer environment rather than a client-server environment.

Client devices 102-104 may also include a game client application, or the like, that is configured to enable an end user to interact with and play a game. The game client may be configured to interact with a game server program or the like. In one embodiment, the game client is configured to provide various functions, including, but not limited to, authentication, ability to enable an end-user to customize a game feature, synchronization with the game server program, and the like. The game client may further enable game inputs, such as keyboard, mouse, and the like. The game client may also perform some game-related computations, including, but not limited to, audio, game logic, physics computations, visual rendering, and the like. In one embodiment, client devices 102-104 are configured to receive and store game-related files, executable files, audio files, graphics files, and the like, that may be employed by the game client, game server, and the like.

In accordance with the present invention, in a manner described in further detail elsewhere in this Specification, client devices 102-104 are configured to receive, from an anti-cheat server, and store anti-cheat modules, encrypted anti-cheat black boxes, and the like. Client devices 102-104 are further configured to decrypt and execute code within anti-cheat black boxes and the like in accordance with challenges received from the anti-cheat server and to return results of such operations to the anti-cheat server. In one embodiment, the anti-cheat server resides on a dedicated network device, such as the anti-cheat network device 106. However, the invention is not so limited. For example, the game network device 107 may be configured to include the anti-cheat server program or the like.

In one embodiment, the game server resides on a network device such as the game network device 107. However, the invention is not so limited. For example, client devices 102-104 may also be configured to include the game server program or the like, such that the game client and game server may interact on the same client device, or another client device. Furthermore, although the present invention is described as employing a client-server architecture, the invention is not so limited. Thus, other architectures may be employed, including but not limited to peer-to-peer and the like.

Network 105 is configured to couple client devices 102-104, and the like, anti-cheat network device 106, and game network device 107 to one another. Network 105 is enabled to employ any form of computer-readable media for communicating information from one electronic device to another. Network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may use analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art.

Network 105 may further employ a plurality of wireless access technologies including, but not limited to, second (2G), third (3G), or fourth (4G) generation radio access for cellular systems, wireless LAN, and the like. Access technologies such as 2G, 3G, 4G and future access networks may enable wide area coverage for mobile devices, such as client device 102, with various degrees of mobility. For example, network 105 may enable a radio connection through a radio network access such as Global System for Mobile Communications (GSM), General Packet Radio Services (GPRS), Enhanced Data Rates for GSM Evolution (EDGE), Wideband Code Division Multiple Access (WCDMA), Code Division Multiple Access 2000 (CDMA 2000), and the like.

Furthermore, remote computers and other related electronic devices may be remotely connected to either LANs or WANs by way of a modem and temporary telephone link. In essence, network 105 includes any communication method by which information may travel between computing devices.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal" and "carrier wave signal" include a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media, as well as wireless media such as, but not limited to, acoustic, RF, infrared, and other wireless media.

Each of anti-cheat network device 106 and game network device 107 may include any network device configured to include the anti-cheat server program and the game server program, respectively. As such, both anti-cheat network device 106 and game network device 107 may be implemented on a variety of computing devices including personal computers, desktop computers, mobile devices, multiprocessor systems, microprocessor-based devices, network PCs, servers, network appliances, and the like.

Game network device 107 may further provide secured communication for interactions and accounting information to speed up periodic update messages between the game client and the game server. Such update messages may include, but are not limited to, a position update, velocity update, audio update, graphics update, authentication information, and the like.

Illustrative Network Device

Figure 2:
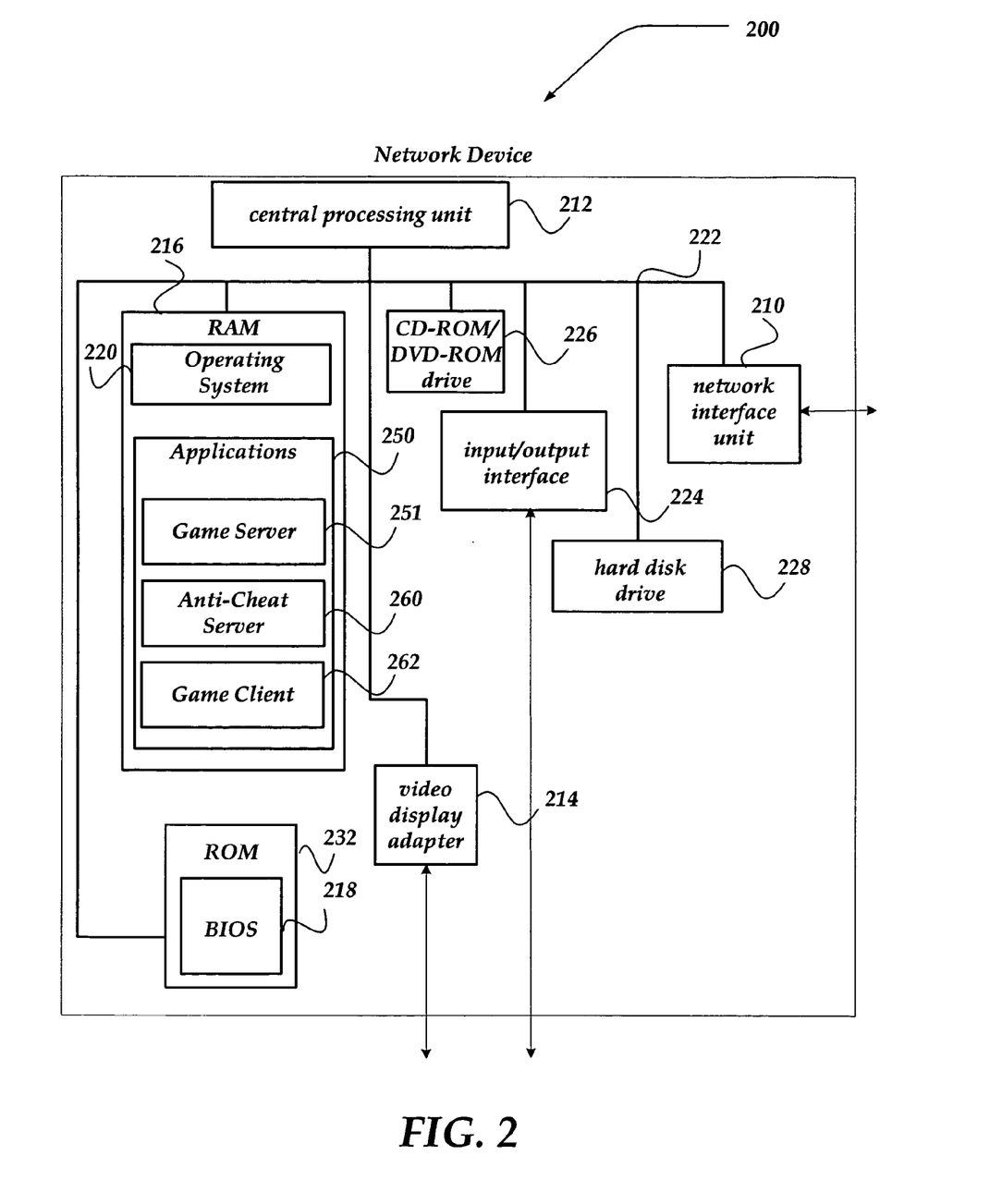
FIG. 2 is a functional block diagram of a network device that may be configured to operate as an anti-cheat server, a game server, a game client, or a peer-to-peer device.

FIG. 2 shows one embodiment of a network device, suitable for use in an embodiment of the invention. Network device 200 may include many more components than those shown. The components shown, however, are sufficient to disclose an illustrative embodiment for practicing elements of the invention. Network device 200 may represent, for example, anti-cheat network device 106 and/or game network device 107 of FIG. 1. Alternatively, network device 200 may represent game client devices 102-104 of FIG. 1, or a device participating in a peer-to-peer network or the like.

Network device 200 includes processing unit 212, video display adapter 214, and a mass memory, all in communication with each other by way of bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Basic input/output system ("BIOS") 218 or the like is also provided for controlling the low-level operation of network device 200. As illustrated in FIG. 2, network device 200 also can communicate over the Internet, or some other computer or communications network, such as network 105 in FIG. 1, by way of network interface 210, which is constructed for use with various communication protocols, such as TCP/IP. For example, in one embodiment, network interface unit 210 may employ a hybrid communication scheme using both TCP and IP multicast with a client device, such as client devices 102-104 of FIG. 1. Network interface unit 210 may be a transceiver, a network interface card (NIC), or the like.

The mass memory as described above illustrates another type of computer-readable medium, namely computer storage media. Computer storage media may include volatile, nonvolatile, removable, and non-removable media implemented in any method or technology for storage of information, such as machine-readable instructions, data structures, program modules, or other data. Examples of computer storage media include RAM, ROM, EEPROM, flash memory or other memory technology, CD-ROM, DVD or other optical storage, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include transcoders, schedulers, graphics programs, database programs, cryptographic programs, word processing programs, user interface programs, and so forth. Mass storage may further include applications such as game server 251, anti-cheat server 260, and game client 262. In a peer-to-peer setting, applications performing substantially the same functions as game server 251, anti-cheat server 260, and game client 262 may be present.

The operation of anti-cheat server 260 in accordance with the present invention is described in more detail below. Briefly, however, anti-cheat server 260 is configured to transmit to game clients, by way of a network or other computer-readable media, black boxes, which are encrypted blocks of cheat detection instructions and other instructions and data, to send packets containing challenges or instructions for manipulating the black boxes to the game clients, to monitor and receive game client responses, to determine whether a game client is engaged in unauthorized behavior and should be banned from a game, and to make appropriate communications with the game server.

Game server 251 is configured to enable an end-user to interact with a game. In one embodiment, game server 251 interacts with a game client residing on a client device, such as client devices 102-104 of FIG. 1. Game server 251 may also interact with other components residing on the client device, another network device, and the like. For example, game server 251 may interact with a client application, security application, transport application, and the like, on another device.

Game client 262 is the application through which a user joins and interacts with a game coordinated by a game server, such as game server 251 or a game server residing on a separate network device linked to network device 200. Game client 262 also interacts with an anti-cheat server, such as anti-cheat server 260, as described in further detail elsewhere in this application.

Network device 200 may also include an SMTP handler for transmitting and receiving e-mail, an HTTP handler for receiving and handling HTTP requests, and an HTTPS handler application for handling secure connections. The HTTPS handler application may initiate communication with an external application in a secure fashion. Moreover, network device 200 may further include applications that support a secure connection, including, but not limited to, TLS, TTLS, EAP, SSL, IPSec, and the like.

Network device 200 also includes input/output interface 224 for communicating with external devices, such as a mouse, keyboard, scanner, or other input device not shown in FIG. 2. Likewise, network device 200 may further include additional mass storage facilities such as CD-ROM/DVD-ROM drive 226 and hard disk drive 228. Hard disk drive 228 may be used to store application programs, databases, client device information, anti-cheat detection code and related data, security information including, but not limited to, certificates, ciphers, and passwords, and the like.

System Architecture

Figure 3:
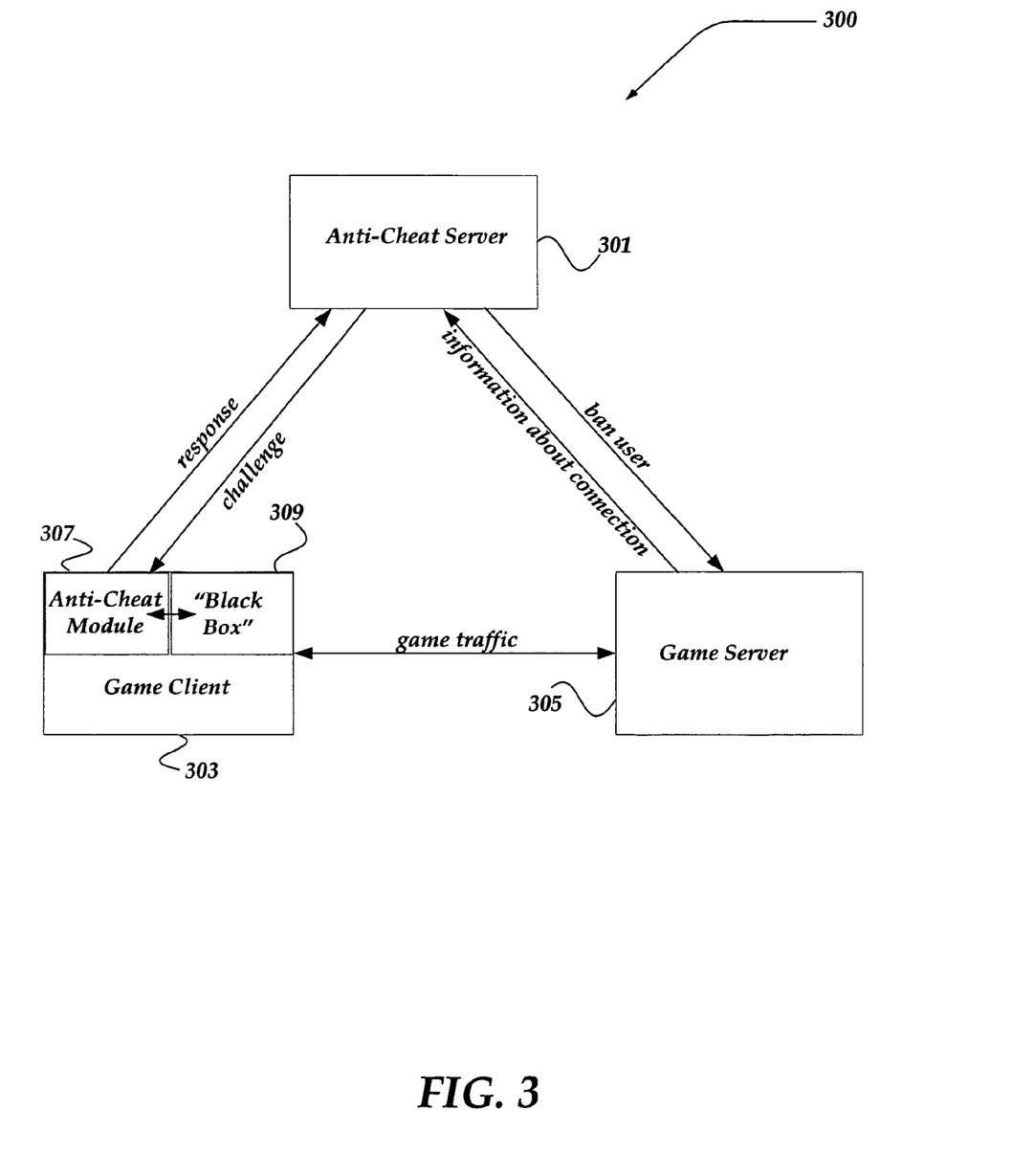
FIG. 3 is a functional block diagram of one embodiment of an interacting anti-cheat server, game server, and game client deployed in a networked environment.

FIG. 3 is a block diagram illustrating the interacting components of a system 300 in accordance with the present invention. Anti-cheat server 301, game client 303, and game server 305 interact with one another. The interaction may in general take place by way of communication over a network, as explained above. While FIG. 3 illustrates client-server relationships among the system components, it will be appreciated by those having skill in the art that system 300 may instead comprise interacting peer-to-peer devices or the like.

Anti-cheat server 301 may be implemented as part of a broader software delivery system and/or content management platform. Anti-cheat server 301 may alternatively be implemented as part of game server 305. Moreover, anti-cheat server 301 is substantially similar to anti-cheat server 260, game client 303 is substantially similar to game client 262, and game server 305 is substantially similar to game server 251 of FIG. 2.

As shown in FIG. 3, game client 303 includes, interacts with or is otherwise associated with an anti-cheat module 307 and one or more black boxes 309. Anti-cheat module 307 is downloaded to and executed on or in association with game client 303. Black box 309 comprises encrypted instructions and data that are transmitted to game client 303 from anti-cheat server 301. Any suitable cryptographic technique can be used to encrypt black box 309, such as RSA or another public key cryptosystem. In one embodiment, an initial black box 309 may be sent to game client 303 with anti-cheat module 307. In one embodiment, a black box 309 is approximately 2 kilobytes in size. In its original, unencrypted form, black box 309 typically includes several sections of instructions and data, including, for example, one or more cheat detection modules or cheat detection routines, and routines for generating responses to challenges received from anti-cheat server 301. Because black box 309 is encrypted, one can have confidence that the player who receives the black box will not independently discover its contents or determine its operation. Black box 309 is preferably customized for or unique to a particular game participant. In one embodiment, a unique black box is generated by anti-cheat server 301 by randomly generating a polymorphic version of a black box template selected from a database of black box templates.

As noted above, downloaded anti-cheat module 307 is configured to receive a series of challenges from anti-cheat server 301 and to return responses to the challenges to anti-cheat server 301. A challenge is included in one or more packets sent by anti-cheat server 301 at regular or irregular periodic intervals, such as every five minutes. The interval preferably comprises a sufficiently narrow time window such that responses sent to anti-cheat server 301 during the interval are trusted and the system can be presumed not to be compromised. A response is trusted in the sense that it is presumed that a cheating player has not had enough time to figure out how to send fake responses showing him to be a non-cheater, or has not figured out how to cause other players to be banned.

A challenge typically includes a decryption key for decrypting all or a portion of black box 309. A challenge may also include one or more parameters. The challenge includes instructions regarding the manipulation of black box 309. For example, the challenge might direct anti-cheat module 307 to a particular address within black box 309 and instruct anti-cheat module 307 to decrypt a range of bytes beginning with the address using the supplied decryption key. The challenge might further instruct anti-cheat module 307 to execute the decrypted portion using the supplied parameters. The executed code might further direct anti-cheat module 307 to decrypt and execute another portion of black box 309. In one embodiment, a challenge includes a new black box along with a key, parameters, and instructions for using the key and parameters with the new black box. A subsequent challenge may comprise a variation on a previous challenge. The use of parameters in addition to a decryption key permits an extensive number of challenges to be used.

Some challenges involve detections of specific kinds of unauthorized behavior. For example, some challenges attempt to detect cheats, while other challenges attempt to detect whether the process in which anti-cheat module 307 is running is maintaining its integrity. Still other challenges are no-ops, performing no detection but causing game client 303 to be disconnected if no response to the challenge is made. A challenge and the black box to which it is directed are of such a nature that the player is highly unlikely to be able to determine or predict whether the challenge will actually perform a meaningful procedure or simply execute a no-op, and whether the challenge is the same as a challenge received by any other player. Each challenge preferably appears different from previous challenges, so that a malign player is unlikely to be able to determine whether the challenge performs some operation that was performed by a previous challenge or whether the challenge is a new cheat detection mechanism. A challenge is also preferably designed to be of sufficient complexity that a cheating client is unlikely to be able to automate the production of a correct response, or to determine whether to turn off a particular cheat mechanism to avoid detection by a particular challenge. For example, a challenge might cause anti-cheat module 307 to decrypt and execute a portion of code that performs a complex mathematical function upon given parameters. If the function result is divisible by a given large prime number, anti-cheat module 307 may then be directed to use the result as a key for decrypting a specified second portion of black box 309.

In another embodiment, a challenge sent by anti-cheat server 301 is accompanied by unencrypted code which the challenge directs anti-cheat module 307 to execute and return the result. In this case, it is important that game client 303 not be able to recognize whether the unencrypted code resembles any previous challenge.

In one kind of attack on prior anti-cheat systems, a game player operates two computers. The player uses the responses produced by a "good" computer as the responses to be returned by anti-cheat module 307 on game client machine 303 being used for cheating or other unauthorized behavior. The present invention combats this attack in a number of ways. First, a black box on the cheating client is different from the black box on the non-cheating client. Each black box is associated with particular challenges and responses, so responses from one are not substitutable for responses from the other. Second, information pertaining to a player is communicated to anti-cheat server 301 by game server 305, including information communicated to game server 305 by anti-cheat module 307. This information is incorporated into one or more challenges sent by anti-cheat server 301 to anti-cheat module 307 on game client 303. The required responses to the challenges may also incorporate information derived from game server 305. By way of such techniques, anti-cheat server 31 can determine, with a high degree of confidence, whether the client sending a response is also the client connected to game server 305.

In general, a challenge directs anti-cheat module 307 to return a response to the challenge to anti-cheat server 301. Anti-cheat server 301 authenticates the response. The response provides a means for anti-cheat server 301 to determine whether game client 303 is engaged in some form of unauthorized behavior. For example, anti-cheat server 301 can keep track of whether anti-cheat module 307 responds to challenges within particular time limits. If a response is not sent to anti-cheat server 301 for a certain number of iterations of challenges, anti-cheat server 301 concludes that the player is probably engaged in unauthorized behavior and directs game server 305 to ban the player from play. This may involve interaction between anti-cheat server 301 and game server 305. For example, if game client 303 sends a request to game server 305 to play a game, game server 305 informs anti-cheat server 301. Anti-cheat server 301 then responds with an indication that game client 303 is allowed to play or has been banned from play. A ban itself may be delayed to obfuscate the moment at which a cheat is detected. This makes it difficult for cheat developers and cheaters to figure out which cheats are detected and not detected by the system. The anti-cheat system similarly employs various random time delays to conceal the motion of critical anti-cheat data.

Alternatively, if anti-cheat server 301 determines that game client 303 has failed to answer challenges, anti-cheat server 301 may inform game server 305 that it should disconnect the player from the game if game client 303 is still online and communicating with game server 305. Although not shown, a peer-to-peer network with multiple game participants can be arranged to operate in substantially the same manner as the client-server architecture discussed above. In the peer-to-peer arrangement, the other participants perform substantially the same roles as the game server and the anti-cheat server in substantially the same manner.

Generalized Operation

Figure 4:
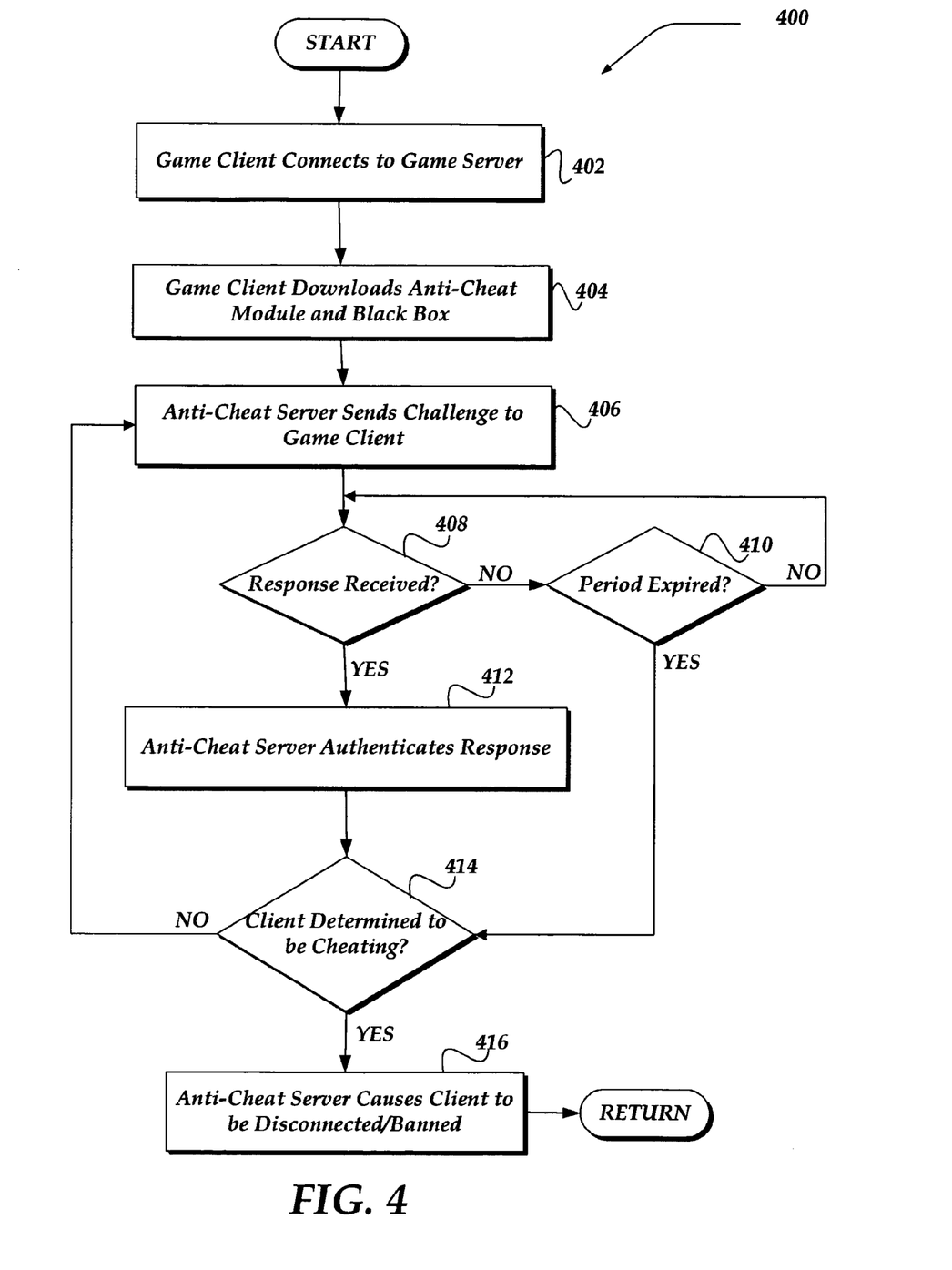
FIG. 4 is a flow diagram generally illustrating one embodiment of a process for detecting whether a client is engaged in unauthorized behavior, in accordance with the invention.

The operation of certain aspects of the present invention will now be described more explicitly as a process with respect to FIG. 4. FIG. 4 is a flow diagram generally showing one embodiment of a process of detecting cheating and other unauthorized behavior by way of an anti-cheat system. Process 400 may be implemented, for example, using the interacting networked components of the system 300 of FIG. 3. Process 400 may also be implemented using interacting devices participating in a peer-to-peer environment, or the like.

Process 400 begins, after a start block, at block 402, where a player connects to a game server by way of a game client and requests to join a game. At this point the game client and the game server are both connected to the anti-cheat server.

At block 404 an anti-cheat module and the initial black box are downloaded to the game client machine. As explained above, the black box includes encrypted instructions, the contents of which are preferably customized for the game client and which may include cheat detection routines, routines for generating responses to challenges by the anti-cheat server, and the like. The anti-cheat module waits to receive instructions, in the form of a challenge, from the anti-cheat server.

At block 406 the anti-cheat server sends a challenge to the game client. A challenge typically includes a key for decrypting a portion of the black box. A challenge may also include one or more parameters to be applied in accordance with the challenge to code that is decrypted. The anti-cheat module at the game client is required to provide a response to the anti-cheat server in accordance with the challenge. A challenge may also include a black box.

A challenge is sent periodically, as explained above in reference to FIG. 3. At decision block 408, if a response is received, processing flows to block 412, at which the anti-cheat server authenticates the response. Otherwise, the process flows to decision block 410, where it checks for expiration of the period for response. If the period (whether regular, randomly determined, etc.) has not yet expired, the process flows back to decision block 408. As depicted in the flow diagram of FIG. 4, the period provides the time within which a response by the game client to the anti-cheat server can be trusted. If the period expires, the process flows to decision block 414. If a response was authenticated at block 412, processing also flows to decision block 414. At decision block 414 the anti-cheat server determines whether, based on the response or lack thereof, the player is likely cheating or engaging in other unauthorized behavior disruptive to the game or the anti-cheat system. For example, if a response to a challenge is sent after the period expires, it may be suspected that the player is a cheating player who has had sufficient time to figure out how to generate correct responses. If no response is provided to a challenge or a series of challenges, or if the content of a submitted response so indicates, the anti-cheat server may conclude that the player is probably a cheater.

If the anti-cheat server determines that the game client has not engaged in unauthorized behavior, the process returns to block 406, at which the anti-cheat server sends a new challenge to the client. If, however, the anti-cheat server determines that the client has engaged in unauthorized behavior, processing flows to block 416, at which the anti-cheat server causes the game client to be disconnected from the game and/or banned from further play. This involves interaction between the anti-cheat server and the game server, as explained above in reference to FIG. 3. As noted above, a ban may be delayed to obfuscate the moment at which a cheat is detected. This is employed to prevent cheat developers and cheaters from being able to discover which cheats are detected and not detected by the system. Following block 416, the process then returns to perform other actions.

It will be understood that each block of the flow diagram discussed above, and combinations of blocks therein, can be implemented by computer program instructions. These program instructions may be provided to a processor to produce a machine, such that the instructions, which execute on the processor, create means for implementing the actions specified in the flow diagram block or blocks. The computer program instructions may be executed by a processor to cause a series of operational steps to be performed by the processor to produce a computer-implemented process such that the instructions, which execute on the processor, provide steps for implementing the actions specified in the flow diagram block or blocks.

Accordingly, blocks of the flow diagram illustration support combinations of means for performing the specified actions, and program instruction means for performing the specified actions. It will also be understood that each block of the flow diagram illustration, and combination of blocks in the flow diagram illustration, can be implemented by special-purpose hardware-based systems, which perform the specified actions or steps, or combinations of special-purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for a server device to detect unauthorized behavior by a client device employed by a participant to play a game over a network, comprising:
   providing a module to the client device that includes at least one encrypted instruction;
   communicating a challenge to the module, wherein the challenge enables the module to access and decrypt at least one encrypted instruction, wherein the at least one decrypted instruction is executed by the client device; and determining whether the participant is engaged in unauthorized behavior while playing the game based on at least one of a response to the challenge from the client device or an absence of the response from the client device within a time limit, wherein the determination is made by the server device, such that the server device determines that the challenge failed if the response to the challenge is incorrect, and such that the server devices determines that the challenge failed if there is an absence of the response from the client device within the time limit.

2. The method of claim 1, wherein communicating the challenge further comprises communicating challenges at periodic intervals.

3. The method of claim 1, further comprising:
providing an executable component to the client device for receiving the challenge and manipulating at least one of the encrypted instructions.

4. The method of claim 1, further comprising:
if the determination for unauthorized, behavior is affirmative, preventing the participant from playing the game.

5. The method of claim 1, further comprising:
if the determination for unauthorized behavior is affirmative, banning the participant from playing the game.

6. The method of claim 1, wherein the challenge includes a decryption key and instructions to the module to decrypt at least one of the encrypted instructions.

7. The method of claim 1, wherein the challenge includes instructions to execute a component decrypted from the encrypted instructions.

8. The method of claim 7, wherein the decrypted component is a cheat detection routine.

9. The method of claim 1, wherein the challenge includes at least one parameter for use in executing a routine decrypted from the encrypted instructions.

10. The method of claim 1, further comprising customizing the encrypted instructions for the participant.

11. The method of claim 10, Wherein customizing the encrypted instructions for the participant further comprises:
selecting a template from a database; and
generating a polymorphic version of the selected template.

12. The method of claim 1, wherein providing the encrypted instructions, communicating the challenge, and determining whether the participant is engaged in unauthorized behavior are performed by the server device, and wherein the participant plays the game on the client device.

13. The method of claim 1, wherein providing the encrypted instructions, communicating the challenge, and determining whether the participant is engaged in unauthorized behavior are performed by a first peer-to-peer device, and wherein the participant's behavior occurs on a second peer-to-peer device.

14. The method of claim 1, wherein communicating the challenge further comprises providing information about the participant.

15. The method of claim 1, wherein the game is a multiplayer game.

16. A server device for detecting unauthorized behavior by a user of a client device that is playing a game over a network, comprising:
a processing unit configured to execute instructions that enable a performance of actions, including:
providing at least one encrypted instruction included with a module to the client device;
communicating a challenge to the client device, wherein the challenge enables the client device to access and decrypt the at least one encrypted instruction; and
determining whether the user of the client device is engaged in unauthorized behavior while playing the game based on at least one of a response to the challenge from the client device or an absence of the response from the client device within a time limit, such that the server device determines that the challenge failed if the response to the challenge is incorrect, and such that the server devices determines that the challenge failed, if there is an absence of the response from the client device within the time limit.

17. The server device of claim 16, wherein the processing unit is further configured to execute instructions such that the actions further include communicating the challenge further comprises communicating challenges at periodic intervals.

18. The server device of claim 16, wherein the processing unit is further configured to execute instructions such that the challenge includes a decryption key and instructions to the client device to decrypt at least one of the encrypted instructions.

19. The server device of claim 16, wherein the processing unit is further configured to execute instructions such that the challenge includes instructions to execute a component decrypted from the encrypted instructions.

20. The server device of claim 19, wherein the processing unit is further configured to execute instructions such that the decrypted component is a cheat detection routine.

21. The server device of claim 16, wherein the processing unit is further configured to execute instructions such that the challenge includes at least one parameter for use in executing a routine decrypted from the encrypted instructions.

22. A client device for detecting unauthorized behavior by a user of the client device that is playing a game over a network, comprising:
a processing unit configured to execute instructions that enable a performance of actions, including:
receiving at least one encrypted instruction included with a module from a server device; and
receiving a challenge from the server device, wherein the challenge enables the client device to access and decrypt the at least one encrypted instruction; and
enabling the server device to determine whether the user of the client device is engaged in unauthorized behavior while playing the game based on at least one of a response to the challenge from the client device or an absence of the response from the client device within a time limit, such that the server device determines that the challenge failed if the response to the challenge is incorrect, and such that the server devices determines that the challenge failed if there is an absence of the response from the client device within the time limit.

23. The client device of claim 22, wherein the processing unit is further configured to execute instructions such that receiving the challenge further comprises receiving challenges at periodic intervals.

24. The client device of claim 22, wherein the processing unit is further configured to execute instructions such that the challenge includes a decryption key and instructions to the client device to decrypt at least one of the encrypted instructions.

25. The client device of claim 22, wherein the processing unit is further configured to execute instructions such that the challenge includes instructions to execute a component decrypted from the encrypted instructions.

26. The client device of claim 25, wherein the processing unit is further configured to execute instructions such that the decrypted component is a cheat detection routine.

27. A non-signal computer-readable non-volatile storage medium having computer-executable instructions for a server device to detect unauthorized behavior by a client device employed by a participant to play in a game over a network, which when executed by one or more processing units, causes actions, comprising:
- providing a module to the client device that includes at least on encrypted instruction;
- communicating a challenge to the module, wherein the challenge enables the module to access and decrypt at least one encrypted instruction, wherein the at least one decrypted instruction is executed by the client device; and
- determining whether the participant is engaged in unauthorized behavior while playing the game based on at least one of a response to the challenge from the client device or an absence of the response from the client device within a time limit, wherein the determination is made by the server device, such that the server device determines that the challenge failed if the response to the challenge is incorrect, and such that the server devices determines that the challenge failed if there is an absence of the response from the client device within the time limit.

28. A system for detecting unauthorized behavior by a user playing in a game over a network, comprising:
- a first device configured to participate in the game; and
- a second device coupled to the first device and configured to provide, to the first device, a module that includes at least one encrypted instruction and a challenge, the challenge enabling the first device to access and decrypt at least one encrypted instruction, wherein the at least one decrypted instruction is executed by the first device, and wherein the second device determines whether the first device is engaged in unauthorized behavior while the user is playing the game based on at least one of a response to the challenge by the first device or an absence of the response by the first device within a time limit, such that the second device determines that the challenge failed if the response to the challenge is incorrect, and such that the second devices determines that the challenge failed if there is an absence of the response from the first device within the time limit.

29. The method of claim 1, further comprising:
- employing the server device and/or another server device to execute an algorithm programmed onto the server device and/or said other server device to randomly generate a black box, such that the randomly generated black box is customized for the participant, and the randomly generated black box includes computer-executable instructions and computer-readable data, such that there is a probability that the randomly generated black box includes a cheat detection module, there is a probability that the randomly generated black box includes instructions for generating a no-op, and there is a probability that the random generated black box includes instructions to perform a mathematic function based on a set of parameters and instructions to use the result of the mathematical function as a key for encryption, and there is a probability that the randomly generated black box further includes instructions to decrypt and execute a portion of code in the black box based on the key; and
- encrypting the randomly generated black box to provide an encrypted black box, such that the encrypted black box includes the at least one encrypted instruction, wherein the at least one encrypted instruction includes encrypted computer-executable instructions, wherein the challenge includes the encrypted black box such that the challenge requires performing instructions in the randomly generated black box, a key for decrypting the encrypted black box, computer-executable instructions for using the key so that the participant can encrypt at least one of the encrypted instructions, and the set of parameters, wherein determining whether the participant is engaged in unauthorized behavior includes employing the server device to determine whether the participant is engaged in unauthorized behavior, such that the determination results in an indication as to whether or not the participant is cheating, wherein the determination includes:
- determining that the participant is engaged in unauthorized activity when the response to the challenge is incorrect; and
- determining that the participant is engaged in unauthorized activity when a response to the challenge is not received within a time limit.

30. The method of claim 29, wherein the mathematical function is complex, and wherein the time limit is brief such that, in conjunction with the complexity of the mathematical function, automated production of a correct response within the time limit is restricted.

31. The method of claim 1, wherein the challenge is randomly generated such that the randomly generated challenge generates a no-op routine.

32. The method of claim 1, wherein the challenge is initiated by the server device, and received by a client device, and wherein determining whether the participant is engaged in unauthorized behavior includes employing the server device to determine whether the participant is engaged in unauthorized behavior, such that the determination results in an indication as to whether or not the participant is cheating, wherein the determination includes: determining that the participant is engaged in unauthorized activity when the response to the challenge is incorrect, and determining that the participant is engaged in unauthorized activity when a response to the challenge is not received within a time limit.

33. The method of claim 29, wherein the mathematical function has a level of complexity, and the time limit has a short duration such that, the level of complexity of the mathematical function and the duration of the time limit are such that automated production of a correct response within the time limit is unlikely.

* * * * *

UNITED STATES PATENT AND TRADEMARK OFFICE
CERTIFICATE OF CORRECTION

PATENT NO. : 8,302,199 B2  Page 1 of 1
APPLICATION NO. : 11/101031
DATED : October 30, 2012
INVENTOR(S) : Matthew Bamberger et al.

It is certified that error appears in the above-identified patent and that said Letters Patent is hereby corrected as shown below:

In column 11, line 20, in Claim 4, delete "unauthorized," and insert -- unauthorized --, therefor.

In column 11, line 38, in Claim 11, delete "Wherein" and insert -- wherein --, therefor.

In column 12, line 9, in Claim 16, delete "failed," and insert -- failed --, therefor.

In column 13, line 5, in Claim 27, delete "on" and insert -- one --, therefor.

In column 13, line 56, in Claim 29, delete "random" and insert -- randomly --, therefor.

Signed and Sealed this
Fifth Day of February, 2013

Teresa Stanek Rea
*Acting Director of the United States Patent and Trademark Office*